(12) United States Patent
Vermeulen et al.

(10) Patent No.: US 11,458,003 B2
(45) Date of Patent: Oct. 4, 2022

(54) TEETH ILLUMINATION DEVICE WITH A LIGHT GUIDE

(71) Applicant: KONINKLIJKE PHILIPS N.V., Eindhoven (NL)

(72) Inventors: Olaf Thomas Johan Antonie Vermeulen, Oss (NL); Adrianus Wilhelmus Dionisius Maria Van Den Bijgaart, Helvoirt (NL); Pascal Jean Henri Bloemen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 474 days.

(21) Appl. No.: 16/476,598

(22) PCT Filed: Jan. 11, 2018

(86) PCT No.: PCT/EP2018/050684
§ 371 (c)(1),
(2) Date: Jul. 9, 2019

(87) PCT Pub. No.: WO2018/130621
PCT Pub. Date: Jul. 19, 2018

(65) Prior Publication Data
US 2019/0358009 A1      Nov. 28, 2019

(30) Foreign Application Priority Data
Jan. 11, 2017 (EP) .................................... 17151010

(51) Int. Cl.
*A61C 19/06* (2006.01)

(52) U.S. Cl.
CPC .................................. *A61C 19/066* (2013.01)

(58) Field of Classification Search
CPC .............................. A61C 19/066; A61C 1/088
(Continued)

(56) References Cited

U.S. PATENT DOCUMENTS 4,790,752 A * 12/1988 Cheslak ................. G02B 6/001
                                                           433/229
5,487,662 A *  1/1996 Kipke ................... A61C 9/0006
                                                            433/29
(Continued)

FOREIGN PATENT DOCUMENTS

CN          2618185 Y      5/2004
CN          1549017 A     11/2004
(Continued)

*Primary Examiner* — Matthew M Nelson

(57) ABSTRACT

The invention relates to an oral care device for teeth whitening or other purpose. The device is designed to provide a uniform light intensity distribution at the teeth. This is achieved by use of a light guide which at some surface parts is separated from surrounding parts of the mouthpiece of the oral care device by air-filled separation portions. The light guide mixes the injected light to improve the uniformity of the light intensity. In 5 order to couple light out from the light guide, the mouthpiece comprises an out-coupling structure located opposite to the buccal side of the teeth. The out-coupling structure may be shaped, e.g. by changing the area or density of parts of the out-coupling structure depending on the distance to a location of the light guide where light is injected.

14 Claims, 6 Drawing Sheets

(58) Field of Classification Search
USPC .......................................................... 433/29
See application file for complete search history.

(56) References Cited

U.S. PATENT DOCUMENTS

| | | | |
|---|---|---|---|
| 6,391,283 B1 | 5/2002 | Jensen | |
| 6,616,447 B1* | 9/2003 | Rizoiu | A61C 19/063 |
| | | | 433/29 |
| 7,645,137 B2 | 1/2010 | Wasyluch | |
| 8,408,775 B1 | 4/2013 | Coleman | |
| 10,758,320 B2* | 9/2020 | Vermeulen | A61C 19/066 |
| 10,758,330 B2* | 9/2020 | Vermeulen | A61C 19/066 |
| 2004/0110111 A1 | 6/2004 | Wasylucha | |
| 2004/0214131 A1* | 10/2004 | Fischer | A61C 19/003 |
| | | | 433/29 |
| 2005/0048434 A1 | 3/2005 | Cipolla et al. | |
| 2007/0224570 A1* | 9/2007 | West | A61C 19/003 |
| | | | 433/29 |
| 2010/0151407 A1* | 6/2010 | Rizoiu | A61C 19/066 |
| | | | 433/29 |
| 2011/0104631 A1* | 5/2011 | Levine | A61C 19/063 |
| | | | 433/29 |
| 2012/0015319 A1 | 1/2012 | Jones et al. | |
| 2012/0214122 A1* | 8/2012 | Dwyer | A61C 19/066 |
| | | | 433/29 |
| 2014/0153278 A1 | 6/2014 | Vayser | |
| 2015/0132709 A1 | 5/2015 | Park | |
| 2015/0164618 A1 | 6/2015 | Heacock et al. | |
| 2019/0358009 A1* | 11/2019 | Vermeulen | A61C 19/066 |
| 2020/0008915 A1* | 1/2020 | Vermeulen | A61C 19/066 |
| 2020/0085554 A1* | 3/2020 | Vermeulen | A61C 19/066 |
| 2020/0261197 A1* | 8/2020 | Young | A61N 5/062 |

FOREIGN PATENT DOCUMENTS

| | | | |
|---|---|---|---|
| CN | 203963543 U | 11/2014 | |
| JP | H0311502 A | 1/1991 | |
| JP | H04194903 A | 7/1992 | |
| JP | H0676935 U | 10/1994 | |
| JP | 2005046421 A | 2/2005 | |
| JP | 2005058594 A | 3/2005 | |
| JP | 2015073756 A | 4/2015 | |
| KR | 100773379 B1 | 11/2007 | |
| WO | 2006020128 A2 | 2/2006 | |
| WO | 2006128021 A1 | 11/2006 | |
| WO | 2006128021 A2 | 11/2006 | |
| WO | WO-2006128021 A2 * | 11/2006 | ............. A61C 17/20 |

* cited by examiner

TEETH ILLUMINATION DEVICE WITH A LIGHT GUIDE

CROSS-REFERENCE TO PRIOR APPLICATIONS

This application is the U.S. National Phase application under 35 U.S.C. § 371 of International Application No. PCT/EP2018/050684, filed on Jan. 11, 2018, which claims the benefit of European Patent Application No. 17151010.0, filed on Jan. 11, 2017. These applications are hereby incorporated by reference herein.

FIELD OF THE INVENTION

The invention relates to teeth illumination devices and to oral care or hygiene devices such as teeth whitening devices.

BACKGROUND OF THE INVENTION

Oral care devices such as teeth whitening devices use light for illuminating the teeth. The light can be used for different purposes including teeth whitening in combination with a whitening gel, plaque or bacteria hygiene by use of disinfecting UV light or other purposes. In order to be effective, the intensity of the light need to be sufficiently high. It may also be important that the light is distributed so that the light intensity is uniform over the teeth. In order to avoid damage of the pulp in the pulp chamber of the teeth it is also important that heating of the teeth is kept safely below a critical temperature.

Accordingly, there is a need for an oral care device which addresses one or more of these requirements. Accordingly, there is a need for an oral care device which is capable of illuminating the teeth with a sufficiently high intensity, with a uniform intensity distribution, and which only causes acceptable heating of the teeth.

US2004/0110111 A1 discloses an apparatus for whitening teeth which allow the user to undergo dental bleaching with the mouth closed and without protruding instruments, trays or electrical wires and the like. The apparatus includes a support structure and a dental whitening composition in contact with the support structure. A light source is included in the apparatus, disposed on or in the support structure so that light emitted from the source contacts on the dental whitening composition. The apparatus has a size permitting the apparatus to fit entirely within the mouth of a user during treatment.

The inventor of the present invention has appreciated that an improved oral care device is of benefit, and has in consequence devised the present invention.

SUMMARY OF THE INVENTION

It would be advantageous to achieve an oral device capable of improving generation of a uniform light intensity at the teeth, alternatively or additionally capable of reducing heating of the teeth. In general, the invention preferably seeks to mitigate, alleviate or eliminate one or more of the above mentioned disadvantages singly or in any combination.

To better address one or more of these concerns, in a first aspect of the invention a mouthpiece for teeth illumination is presented that comprises:

an optically transparent teeth part arranged to face the buccal side of the teeth when in use, a light guide extending along the teeth part and arranged to transmit light to the optically transparent teeth part, wherein the light guide has an outer surface comprising a first surface facing the buccal side of the teeth and a second surface located opposite to the first surface, at least one light source arranged for injecting light into the light guide, a separation portion arranged at least between a part of the first surface of the light guide and the optically transparent teeth part to enable total internal reflection of at least a part of the injected light at least at the part of the first surface, and an out-coupling structure arranged to scatter light at a part of the second surface in the light guide to enable transmission of at least a part of the scattered light through the first surface, where the at least a part of the scattered light propagates from the second surface to the first surface via a body part of the light guide located between the first and second surfaces.

The use of a separation portion between at least a portion of the light guide and the optically transparent teeth part for enabling total internal reflection in the light guide provides light mixing in the light guide which may result in an improvement of the uniformity of the intensity distribution of light at the teeth. The separation portion separates at least a part of the first surface of the light guide from the optically transparent teeth part. The separation portion has a refractive index which is lower than the refractive index of the light guide for enabling the total internal reflection.

Placing the out-coupling structure to achieve scattering at a part of the second surface, i.e. so that scattering of light is only generated at a part of the second surface and, thereby, only at a part of the surface of the light guide, the light in the light guide may travel a longer distance before it is coupled out via the out-coupling structure. The longer travel distance of light rays may further improve uniformity of the intensity distribution of light at the teeth.

Thus, when light is injected into the light guide, light rays will be total internally reflected by parts of the first surface. Due to the total internally reflected rays, the rays will be mixed throughout the light guide to achieve an improvement of uniformity of light intensity. In order to couple the mixed light rays out of the light guide, the out-coupling structure scatters light at a part of the second surface. The scattered light rays will be transmitted through the body part of the light guide to the first surface where some of the scattered light rays will be experience total internal reflection while other rays will be transmitted through the first surface to the teeth via the optically transparent teeth part.

According to an embodiment, the separation portion is an air-filled separation portion. Advantageously, the air-filled separation portion may enable use of materials having a relative low refractive index, but higher than the refractive index of air, for the light guide. Accordingly, a broader range of materials, including flexible materials such as silicone, may be used for the light guide. Flexible materials may be beneficial for the mouthpiece for achieving improved comfort for the user and improved fitting of the mouthpiece in the oral cavity.

According to an embodiment, the mouthpiece further comprises one or more spacers arranged at least between the optically transparent teeth part and the first surface of the light guide for establishment of the separation portion. The spacers may be in the form of thin pillars or other structures of the mouthpiece and arranged for separating the light guide from surrounding materials in order to satisfy conditions for achieving total internal refection within the light guide.

According to an embodiment, the light guide is at least partly enclosed in a body part of the mouthpiece, wherein the body part comprises the optically transparent teeth part. Advantageously, the light guide may be at least partly enclosed in a body part for enabling creation of the separation portion between several surface parts of the light guide and enclosing parts of the body part. Furthermore, the enclosing part of the body part may facilitate creation of spacers for achieving a suspended arrangement of the light guide.

According to an embodiment, the body part comprises protrusions which contact the light guide at one or more contact areas at the second surface to form the out-coupling structures at the contact areas. Advantageously, the out-coupling structures may be integrated with the body part to achieve a simple design.

According to an embodiment, the mouthpiece comprises a reflector arranged behind the second surface when seen from the first surface to reflect light into the light guide. Advantageously, the reflector may improve efficiency by recycling reflected light from the teeth which is transmitted through the out-coupling structure and the second surface. Improving efficiency may lead to lower heat dissipation and thereby enabling a higher light intensity.

According to an embodiment, at least the part of the first surface is a non-scattering surface. Advantageously, the non-scattering surface may, to a large extent, cause complete total internal reflection of the injected light at the first surface which may lead to improved light mixing. The non-scattering part may be achieved by arranging the out-coupling structure so that it does not cause out-coupling at least at a part of the first surface.

According to an embodiment, the out-coupling structure comprises a plurality of separated out-coupling structures arranged to scatter light at plurality of separated locations of the second surface in the light guide. Advantageously, by use of separated locations for the out-coupling of light, the separated out-coupling structure may be distributed to improve the uniformity of light intensity over the surface of the teeth.

According to an embodiment, at least some of the separated out-coupling structures have different surface areas facing the first surface. The surface areas may advantageously be varied to achieve a variation of the out-coupling, e.g. for compensating the gradual decrease of emitted intensity from the light sources along the principal axis of the light sources. For example, according to an embodiment, the surface areas may be dependent on the distance between the separated out-coupling structures and the at least one light source.

For example, the separated out-coupling structures may extend as longitudinal areas along a direction of one or more locations of the at least one light source, wherein the one or more light sources are arranged along at least one side of the light guide. Thus, a single out-coupling area may have a longitudinal shape, e.g. a rectangular shape, which extend in the longitudinal direction along a row of light sources, e.g. along an edge of the light guide where light sources are arranged to inject light into the light guide. Advantageously, the separated out-coupling structures may extend along the location(s) of light source(s) to achieve a simple design of the out-coupling structures.

In another example, the longitudinal area has a varying width along the longitudinal direction of the areas, wherein the varying width correlates with the one or more locations of the at least one light source. The varying width may be arranged to compensate for the variation of emitted light intensity along the locations of the plurality of light sources, e.g. so that the width is largest between neighbor light sources and smallest at locations just in front of light sources.

According to an embodiment, the sealing structure is arranged for retaining an applied dental substance within a space defined by the optically transparent teeth part, a rim and the buccal side of the teeth. Advantageously, the mouthpiece may comprise a sealing structure to help keeping the dental substance in place between the teeth and the transparent window of the mouthpiece. For example, the mouthpiece may be a teeth-whitening mouthpiece and the dental substance may be a teeth-whitening gel.

According to an embodiment, the optically transparent teeth part and the light guide are made from the same optically transparent material. For example, the teeth part and the light guide may be made from the same optically transparent, and optionally flexible, material such as silicone. Additionally, the body part may also be made from the same flexible material, e.g. silicone or silicone rubber. However, the body part material need not be transparent. Accordingly, at least the teeth part and the light guide may be made from the same material in order to make the production simpler.

According to an embodiment, the light guide is made from a silicone material. Use of a silicone material for the light guide may be advantageous compared to other materials for achieving a flexible and user adaptable mouthpiece. For example, use of flexible materials such as silicone rubber for the transparent teeth part, the light guide and the body part may advantageously improve shape retaining and fitting properties to increase user comfort.

According to an embodiment, the optically transparent teeth part comprises a protruding bite part extending along the optically transparent teeth part, wherein the protruding bite part extends outwardly to form a bite surface. The bite part may advantageously improve fitting of the mouthpiece to different mouth cavities. Additionally, the bite part may help retaining the shape of the mouthpiece when the mouthpiece is pressed into the mouth cavity.

A second aspect of the invention relates to use of a mouthpiece according to the first aspect for teeth illumination comprising the steps of:

arranging the mouthpiece so that the optically transparent teeth part faces and extends along the teeth of a user, and illuminating the teeth by light transmitted successively through the first surface of the light guide and the optically transparent teeth part.

The use of the mouthpiece may include a step of applying a dental substance, e.g. a teeth whitening gel, at the teeth, at the rim, at the transmission window or a combination thereof.

In general, the various aspects of the invention may be combined and coupled in any way possible within the scope of the invention. These and other aspects, features and/or advantages of the invention will be apparent from and elucidated with reference to the embodiments described hereinafter.

In summary, the invention relates to an oral care device for teeth whitening or other purpose. The device may be designed to provide a uniform light intensity distribution at the teeth. This is achieved by use of a light guide which at some surface parts is separated from surrounding parts of the mouthpiece of the oral care device, e.g. by air-filled separation portions. The light guide mixes the injected light to improve the uniformity of the light intensity. In order to couple light out from the light guide, the mouthpiece comprises an out-coupling structure located opposite to the buccal side of the teeth. The out-coupling structure may be shaped, e.g. by changing the area or density of parts of the out-coupling structure depending on the distance to a location of the light guide where light is injected.

BRIEF DESCRIPTION OF THE DRAWINGS

Embodiments of the invention will be described, by way of example only, with reference to the drawings, in which.

DESCRIPTION OF EMBODIMENTS

Figure 1:
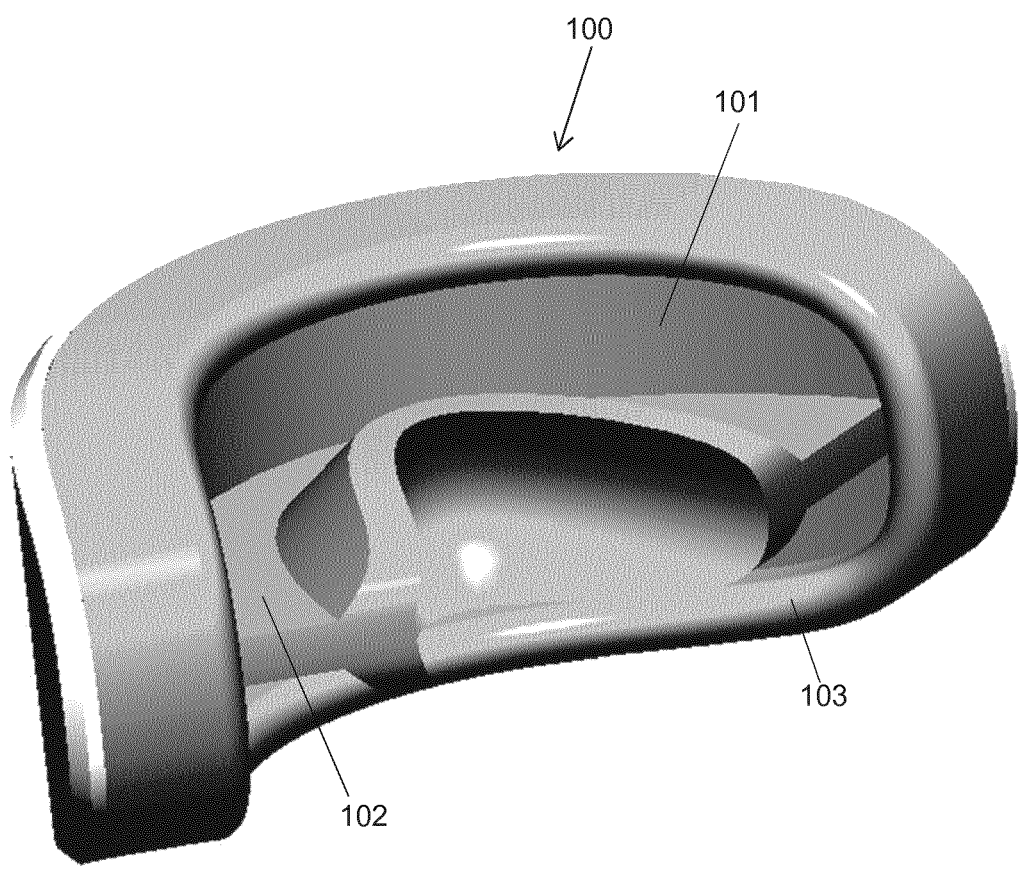
FIG. 1 illustrates a mouthpiece for use as a teeth illumination device.

FIG. 1 illustrates a mouthpiece 100 for use as a teeth illumination device. The teeth of a user may be illuminated for the purpose of teeth whitening, plaque or bacteria hygiene, or other oral hygiene or care uses. The mouthpiece may be a consumer product for home use or a professional product to be used by a professional, in both cases the user, i.e. the home user or the patient, is the person that receives the illumination from the device.

The mouthpiece 100 comprises an optically transparent teeth part 101 arranged to face the buccal side of the teeth when in use, an optional protruding bite part 102 extending along at least a part of the teeth part, and optionally a rim 103 which as illustrated may be formed as a closed rim which circumscribes the optically transparent teeth part 101, alternatively as an rim with openings, e.g. near the end-surfaces of the bite part 102, so that the rim 103 partly circumscribes the optically transparent teeth part 101.

The bite surface extends outwardly to form a bite surface, i.e. the illustrated plane of the bite part 102. The user can bite onto the upper and lower bite surface so that the upper and lower occlusal sides of the teeth contacts the bite surfaces and so that the mouthpiece can be held in place in the mouth. A further function of the bite part 102 is to retain the shape of the mouthpiece 100 when a force is applied to the mouthpiece 100. E.g. when the mouthpiece 100 is too big for a user, the user applies a pressure to the mouthpiece 100 so that rim makes contact with the gums. This is necessary in order to confine a dental substance within the rim-structure (see below). By use of elastic materials such as silicone rubber for the mouthpiece—e.g. for the light guide 203, the optically transparent teeth part 101 and the body part 206—the amount of pressure a user has to apply on the bite surface is kept to a minimum to maintain user comfort.

In general different elastic materials may be used for one or more parts of the mouthpiece, e.g. for the light guide 203, the optically transparent teeth part 101 and/or the body part 206. Preferably, transparent silicone materials or transparent polysiloxane polymers may be used for the light guide 203 and possibly for one or more other parts of the mouthpiece including the optically transparent teeth part 101 and the body part 206.

The rim 103 may be shaped to contact gums of a user along the upper and lower dental arches. A function of the rim is to serve as a sealing structure for preventing teeth whitening gel or other dental substances from leaking out and to assist in retaining the dental substance at a location of the teeth.

The teeth part 101 is referred to as a transparent part, i.e. transparent in the sense the light is not scattered in the teeth part. However, in practice the transparent material of the teeth may contain irregularities, e.g. particles, implying that some light scattering will take place. Accordingly, the teeth part may be referred to as an optically translucent teeth part.

Figure 2A:
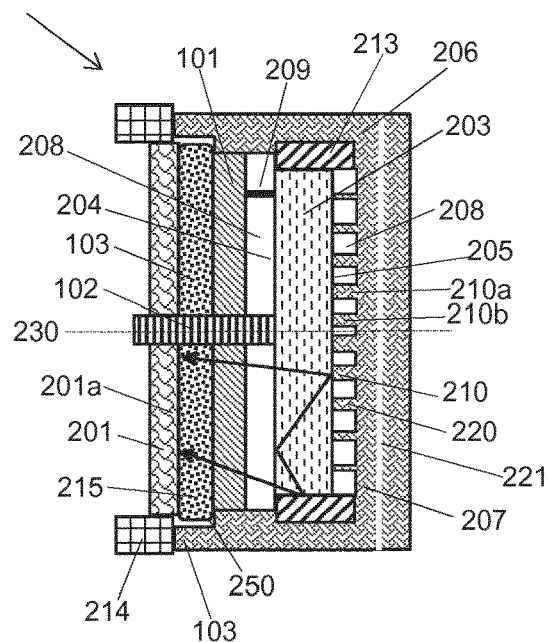
FIGS. 2A and 2B illustrate cross-sectional views in a plane perpendicular to a bite surface in alternative embodiments of mouthpieces.

FIG. 2A shows a principal sketch of a cross-sectional view of the mouthpiece 100 in a plane perpendicular to the bite surface of the bite part 102.

FIG. 2A shows the optically transparent teeth part 101 arranged to face the buccal side of the teeth 201, i.e. arranged so that an outer surface of the teeth part 101 faces the buccal side of the teeth 201. FIG. 2A further shows the bite part 102 and the rim 103.

The mouthpiece further comprises a light guide 203 extending along the teeth part 101 and one or more light sources 213 arranged for injecting light into the light guide. The light guide has an outer surface comprising a first surface 204 facing the buccal side of the teeth and a second surface 205 located opposite to the first surface. The light guide 203 is therefore arranged to transmit light to the optically transparent teeth part 101 via the first surface 204 and the optically transparent teeth part 101 is arranged to transmit light from the light guide towards the teeth 201, particularly the buccal side of the teeth.

The light guide 213 may have a rectangular, elliptical or circular cross-sectional shape in a plane perpendicular to its longitudinal direction. In case of a rectangular shape, the first surface 204 may refer to one of the plane faces of the light guide. In case of a circular or elliptical cross section, the first surface 204 may refer to a portion of the surface arranged to face the buccal side of the teeth. For reference purposes, the present description defines that the light guide 203 has a longitudinal extension along the dental arches, i.e. in a direction into the cross-sectional plane in FIG. 2A, and a vertical extension from the bottom to the top of the light guide 203 in the cross-sectional view.

The optically transparent teeth part 101 may be a part of a body part 206 of the mouthpiece 100 which at least partly surrounds the light guide 203 so that the light guide is at least partly enclosed by the body part 206. The body part may consist of different parts, where the optically transparent teeth part 101 constitutes one or more parts and where one or more other parts, e.g. the back side 207 comprises a different opaque or semi-transparent material. Alternatively, the optically transparent teeth part 101 and the back side 207, possibly the entire body part 206, may be formed from the same transparent material. For example, when the mouthpiece comprises the bite part 102, the optically transparent teeth part 101 may consist of two parts since the bite part 102 may divide the teeth part 101 into two parts.

The mouthpiece 100 comprises at least one separation portion 208 which separates the light guide 203 from the surroundings such as the body part 206 and the transparent teeth part 101 at least at some locations of the surface of the light guide 203. The separation portion 208 may be a gas-filled or air-filled separation portion which therefore has a refractive index which is lower than the refractive index of the material of the light guide 203. Thus, the separation portion 208 may be embodied by an air-gap or an empty space which contains ambient air. Accordingly, light rays which hits the surface of the light guide 203 with an oblique angle at a location where the light guide is separated by a separation portion 208 will be subject to total internal reflection. The maximum oblique angle required for generating total internal reflection is governed by known optical laws.

Ideally, to achieve total internal reflection over most of the first surface 204, the separation portion 208 should extend over as large a part of the first surface 204 as possible. However, when the separation portion 208 consists of e.g. air, one or more spacers 209 may be needed to ensure that the light guide does not make contact with the surroundings at the intended locations of the separation portion 208. The spacers may be in the form of protruding studs, i.e. pillars, of the light guide 203 protruding outwardly from the first surface 204 and/or the second surface 205. Alternatively or additionally, the spacers may be in the form of protruding studs of the optically transparent teeth part 101, the body part 206 or other portion of the mouthpiece 100 having a surface opposite to the first or second surface of the light guide 203. A single spacer 209 is schematically illustrated. End-faces of such spacers contacting the light guide 203 may be made reflective to maintain high efficiency and/or uniformity of the light from the light sources. Accordingly, the spacers 209 constitute structures which are responsible for creating the separation portion 208, i.e. the separation between at least the optically transparent teeth part 101 and the first surface 204 of the light guide.

FIG. 2A shows that that bite part 102 extends through the separation portion 208 to the first surface of the light guide 203. Accordingly, the extension of the bite part 102 towards the light guide 203 functions as a spacer 209. In this case, where the extension of the bite part 102 is used as a spacer 209, this extension may constitute the only spacer at the first surface of the light guide 203. In order to avoid the light being transmitted into the bite part via the contact with the light guide, the surface of the extension of the bite part 102 which contacts the light guide may be diffusive or specular reflective in order to reflect incident light back into the light guide.

Figure 2B:
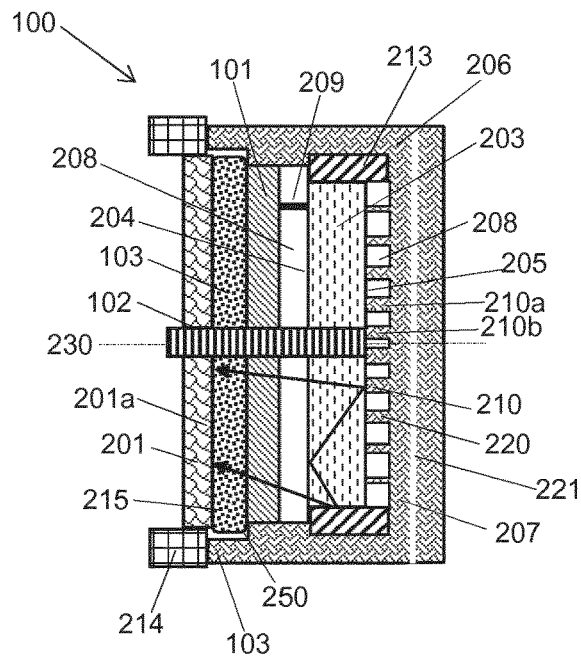

In another example as shown in FIG. 2B, the bite part 102 is extended through the width of the light guide and the light guide is configured as two separated light guides, where each light guide 203 extends from the light source 213 in one end to the bite part 102 in the other end. Again the surface of the extension of the bite part 102 which contacts the light guide may be diffusive or specular reflective. Thus, in general, the mouthpiece is arranged to enable total internal reflection of at least at a part of the first surface of the light guide, and when one or more spacers are required for separation of the first surface, internal reflection is enabled of a part of the first surface of the light guide.

Accordingly, the mouthpiece 100 is optically arranged to enable total internal reflection of at least a part of the injected light in the light guide 203 by means of the at least one separation portion 208. When light is injected into the light guide from the at least one light source 213, most rays will be emitted with an oblique angle relative to the first and second surfaces which satisfies the requirement for achieving total internal reflection. However, depending on the light emitting properties of the light sources 113, some rays may be emitted with an angle too large to be internally reflected and will therefore escape the light guide by refraction, as illustrated. Such escaping rays would cause hotspot. Therefore, in an embodiment, the first surface 204 may be provided locally with total or partly diffuse reflective surfaces, e.g. at surface parts at the ends of the light guide.

In order to couple light out of the light guide towards the teeth 201, the mouthpiece 100 further comprises an out-coupling structure 210 arranged to scatter light at a part of the second surface 205 in the light guide to enable transmission of at least a part of the scattered light through the first surface. Some of the light rays scattered by the out-coupling structure has an angle relative to the first surface 204 which is large enough to be coupled out through refraction, while other scattered rays has an angle which is sufficiently oblique to be internally reflected. Thus, at least a part of the light scattered by the out-coupling structure 210 propagates from the second surface 205 to the first surface 204 through the thickness of the light guide between the first and second surfaces and propagates through the first surface 204 towards the buccal side of the teeth 201. Particularly, the out-coupling structure may be configured to scatter light only at a part of the second surface 205, but not at the first surface 204.

FIG. 2A also shows the rim 103 which contact the gums 214, and the dental substance 215, e.g. teeth whitening gel located between the teeth 201 and the optically transparent teeth part 101 and held in place by the rim 103. The dental substance may have been applied by the user at the buccal side of the teeth, at the optically transparent teeth part 101 and/or at the rim 103 before the mouthpiece is inserted. Accordingly, the buccal side 201a of the teeth 201, the rim 103 and the optically transparent teeth part 101 (i.e. a face of the teeth part 101 facing the buccal side of the teeth) defines a space for containing the dental substance. The rim 103 may be seen as a part of a sealing structure 250. Additionally, the optional bite part 102 may also be seen as a part of the sealing structure 250 since the bite part 102 restrains the location of the dental substance to above or below the occlusal plane 230. Thus, the sealing structure 250 is capable of retaining the applied dental substance within a space defined by the buccal side 201a of the teeth 201, the rim 103 and the optically transparent teeth part 101, i.e. a face of the teeth part 101 facing the buccal side 201a of the teeth.

The out-coupling structures 210 may be made in different ways. For example, the out-coupling structures may be made by applying a paint, adhesive or other material at the parts of the second surface 205 where scattering of the incident light is wanted. In another example, the out-coupling structures may be made by making the second surface 205 rough, e.g. by etching, sandblasting the surface or applying a molded scattering surface structure during molding of the light guide 203, at the parts of the second surface 205 where scattering of the incident light is wanted. In another example, the body part 206 may be configured with protrusions 220 which contact the light guide at one or more contact areas at the second surface 205 to form the out-coupling structures at the contact areas. For example, the body part 206 or the back side 207 comprising the protrusions 220 may be configured to scatter light, e.g. by using a white material for the body part. For example, the body part 206 or the back side 207 may be made from silicone or other elastic material filled with scattering particles like TiO2, AlO2 or other particles. Such scattering particles are preferably used to increase the thermal conductivity of the material of the body part 206 or the back side 207.

In general, the out-coupling structure is arranged opposite to the first surface 204. Accordingly, an out-coupling structure in the form of a rough surface of the second surface 205 is located opposite to the first surface 204. An out-coupling structure in the form of the protrusions 220 or a paint on the second surface 205 is arranged opposite to the first and the second surface.

The mouthpiece 100 may include a reflector 221 arranged behind the second surface 205—and possibly arranged behind the out-coupling structure 210—in order to reflect light, e.g. scattered light from the teeth 201 which is transmitted through the light guide 203 and the out-coupling structure 210 via the first surface 204, back into the light guide 203. The reflector 221 may be a surface of the back side 207. For example, the back side 207 may be formed from an opaque material or a transparent material filled with scattering particles. In this case the surface of the back side 207 facing the second surface 205 may constitute the reflector 221. In another example, the back side 207 is formed from a transparent material. In this case the reflector 221 may be formed by a reflective surface of the back side 207, e.g. a white-painted outer surface or other reflective material connected with the outer surface of the back side 207.

The out-coupling structure may be arranged so that the first surface is a non-scattering surface, i.e. so that light is not transmitted through the first surface 204 by scattering but by refraction.

As shown in FIGS. 2A and 2B, the out-coupling structure comprises a plurality of separated out-coupling structures, e.g. structures 210a, 210b, arranged to scatter light at a plurality of separated locations of the second surface 205 of the light guide 203. As illustrated, at least some of the out-coupling structures can have different heights along the vertical direction of the light guide 203, i.e. along the principal illumination direction of the one or more light sources 213. Accordingly, in general, the out-coupling structures 210 may have different surface areas facing the first surface 204. For example, the different heights or surface areas of the out-coupling structures may increase or vary dependent on the distance of an out-coupling structure 210 from one of the light sources 213. For example, the areas of the out-coupling structures below the occlusal place 230 in FIG. 2A may increase as the distance to the light source 213 below the occlusal plane 230 increases. The area of an out-coupling structure facing the first surface 204 is the area responsible for scattering light at the second surface 205. For example, the area of the out-coupling structure may be the area of a paint at a part of the second surface 205 where scattering is desired, the area of a rough surface part at the surface 205 or the area of a protrusion 220 which contacts the second surface 205.

By changing the area of the out-coupling structures dependent on the distance to the light sources 213, the probability that a light ray from a light sources 213 hits a location with an out-coupling structure increases along the principal direction of light propagation (here vertical direction of the light guide 203), i.e. increases as a function of the distance to the light source 213 so that light reaching the teeth becomes more uniform. Alternatively or additionally to changing the area, heights or other dimensions of the out-coupling structures, the out-coupling of light can be made dependent on the distance between a location along the light guide and the one or more light sources 213 by changing the density of the out-coupling structure 210 or by changing shapes or patterns of the out-coupling structures. The density of the out-coupling structure may be varied e.g. by changing the density of a scattering structures applied to the second surface 205, e.g. by applying a molded surface structure which varies along the vertical direction of the second surface 205 or along the principal direction of light propagation. Accordingly, in general the out-coupling structure may be configured so that the intensity of light scattered by the out-coupling structure depends on the distance between a location along the vertical direction of the second surface 204 and the at least one light source. The out-coupling structure 220 may be varied, e.g. by means of area or density variations. Thereby, the probability that a light ray from a light source hits the out-coupling structure 220 achieves a maximum at the occlusal plane 230 farthest away from one or both of the ends of the light guide or from the one or more light sources. In embodiment, where the at least one light source is only placed at the lower vertical end of the light guide 213 below the occlusal plane 230, but not at the upper vertical end of the light guide, or oppositely, the out-coupling structure may be varied so that the probability that a light ray from a light source hits the out-coupling structure 220 achieves a maximum at the vertical end of the light guide without light sources.

Figure 3:
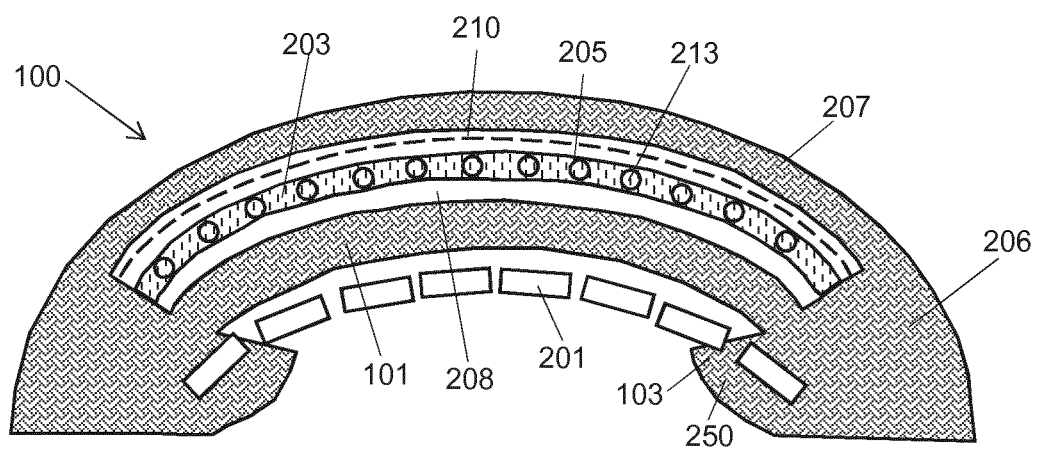
FIG. 3 illustrates a cross-sectional view in a plane parallel with the occlusal plane of a mouthpiece comprising a plurality of light sources.

FIG. 3 shows a cross-sectional view of the mouthpiece 100 in a plane parallel with the occlusal plane, i.e. the bite plane. FIG. 3 shows a plurality of light sources 213 arranged along the longitudinal direction of the light guide 203 and along the dental arch of the teeth 201. For convenience, the separation portion 208 is shown without spacers 209 and the bite part 102 is not visible in this view. The out-coupling structure 210 is principally shown as a dotted line distanced from the second surface 205 of the light guide 203, but it is understood that the out-coupling structure 210 contacts or is part of the second surface 205.

Figure 4:
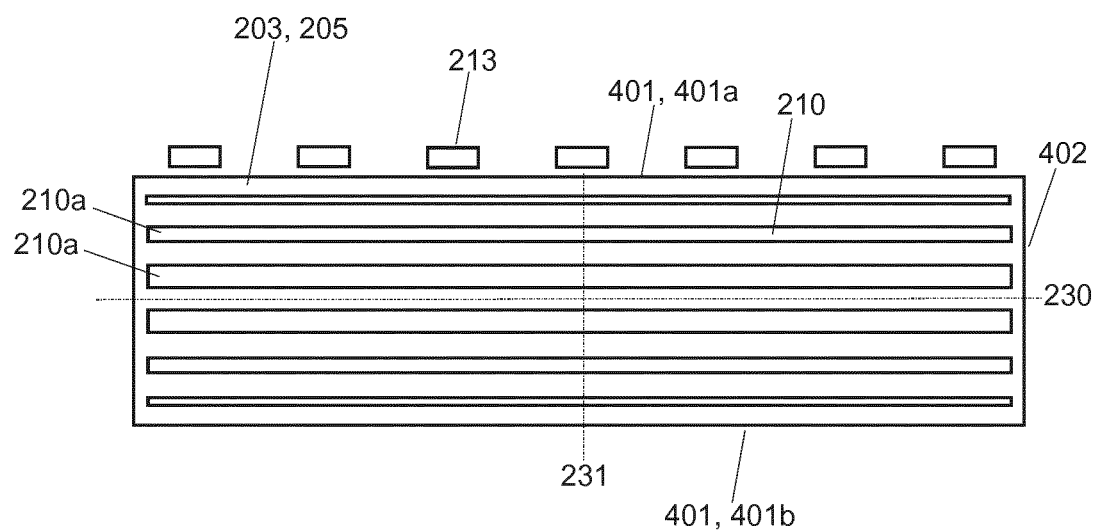
FIG. 4 illustrates an out-coupling structure for the mouthpiece.

FIG. 4 shows a front view of the light guide 203 seen towards the second surface 205 and towards the out-coupling structures 210. In this example, the mouthpiece 100 is configured so that the out-coupling structures 210 extend as longitudinal areas along a direction of locations of the plurality of light sources 213, i.e. along the longitudinal direction 401 extending along the dental arch. The height of the separated out-coupling structures 210 increases along the vertical direction 402 as the distance to the longitudinal side 401 increases to achieve a maximum area at or next to the occlusal plane 230. As previously described, the one or more light sources 213 may be arranged along the upper longitudinal side 401a, along the lower longitudinal side 401b or along both sides. In the present example, where the area of the out-coupling structure 210 attains a maximum at or adjacent to the occlusal plan 230, it may be advantageous to have one or more light sources 213 at the upper longitudinal side 401a, and one or more light sources 213 along the lower longitudinal side 401b. For convenience, in FIG. 4 the light sources 213 are only shown along the upper longitudinal side.

As an alternative (not shown), the mouthpiece 100 may be configured so that the out-coupling structures 210 extend as longitudinal areas along the vertical direction 402, i.e. in a direction perpendicular to the occlusal plane 230. In this case, the height of out-coupling structures 210 (the dimension of the separated out-coupling structures in the longitudinal direction 401) increases along the longitudinal direction 401 as the distance to the vertical side 402 increases to achieve a maximum area at or next to the dental midline 231 or at the opposite side 402 (in case no light source is arranged at that side). In this example, the one or more light sources 213 may be arranged along the left vertical side 402, along the right vertical longitudinal side 402 or along both vertical sides.

Arrangement of the light sources 213 along the upper longitudinal side 401a and/or along the lower longitudinal side 401b may be preferred compared to arrangement of the light sources along the vertical direction 402 in order to enable distribution of the light sources over a larger area. The distribution over a larger area may reduce light intensity and thermal hotspots produced by the light sources. Furthermore, by arranging the light sources 213 along the upper and/or lower longitudinal sides 401a, 401b the waste heat from the light sources is generated at a teeth area covered by gums where the blood profusion will function as a heat sink.

Figure 5:
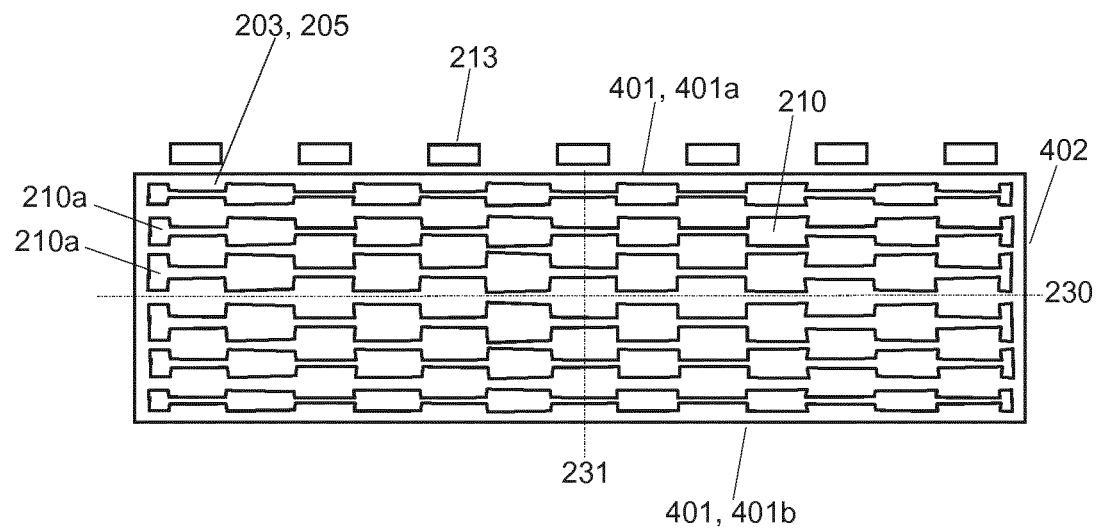
FIG. 5 illustrates an alternative out-coupling structure for the mouthpiece.

FIG. 5 illustrates the front view of the light guide 203 similarly to FIG. 4. FIG. 5 shows an example of the out-coupling structures 210 where at least some of the longitudinal areas of the out-coupling structures 210 has a width or height which varies along the longitudinal direction of the areas (i.e. along the longitudinal direction 401 or the vertical direction 402, the latter example is not illustrated). As illustrated, the variation of the width or height of out-coupling structures 210 correlates with locations of the one or more light sources. For example, as illustrated, the out-coupling structures 210 may have a width between adjacent light sources 213 which is greater than the width at locations where light sources are placed in order to compensate for the variations of light intensity along the vertical side 402 or longitudinal side 401 along which the light sources are arranged.

Figure 6:
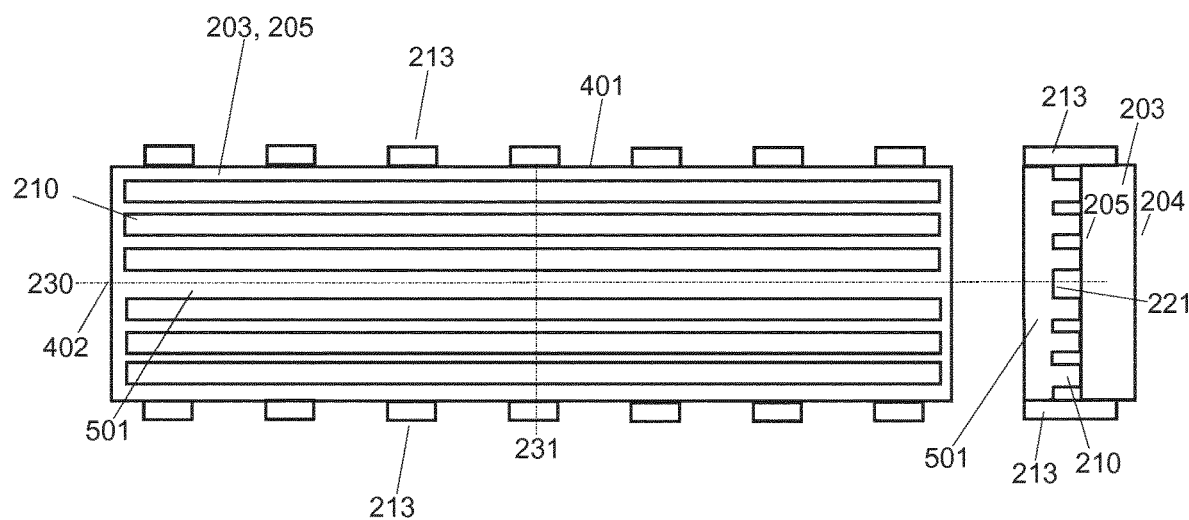
FIG. 6 illustrates use of a printed circuit board for the out-coupling structure.

FIG. 6 illustrates an example of the mouthpiece 100 where a reflector part 501 of the mouthpiece, e.g. constituting or comprised by the back side 207 of the body part 206, comprises both the reflector 221 and the out-coupling structure 210. The illustration to the left shows the reflector part 501 in a front view seen towards the out-coupling structure 210 from the first side 204 of the light guide 203. The illustration to the right shows a side view of the reflector part 501 and the light guide 203. The occlusal plane 230 and the dental midline 231 are also shown.

For example, the reflector part 501 may be a printed circuit board (PCB) such as a multilayered printed circuit board with multiple layers of electrically conductive tracks and outer metal (e.g. copper) surfaces. The one or more light sources 213 may be electrically connected to an electrical source via the electrically conductive tracks. For example, a metal layer on the back side of the reflector part 501 (the left side in FIG. 6) may be electrically connected with one of the terminals of the one or more light sources 213 and one or more inner layers of conductive tracks may be electrically connected with another of the terminals of the one or more light sources 213.

The protruding out-coupling structures 210 at the front side of the reflector part 501 (the right side in FIG. 6) may be formed in a metal layer on the front side by removing metal at locations other than locations of the out-coupling structures 210 so that out-coupling structures 210 stands out as illustrated. The metal may be removed by know methods such at etching. The extension of the out-coupling structures is largely exaggerated, in practice the out-coupling structures need only protrude by a length corresponding to the thickness of the metal layer of the printed circuit board 501 or even less.

After the out-coupling structures 210 has been made by removing metal, the front surface may be covered with a reflective material, e.g. white paint, so that the valleys of the front surface can function as the reflector 221. The contact surfaces of out-coupling structures 210 can be connected to the second surface 205 of the light guide 203 by use of an adhesive or by joining the parts together by a thermal process.

Accordingly, the out-coupling structures 210 and the reflector 221 may be integrated in a structured surface of a reflector part 501. The reflector part 501 may be a printed circuit board and the one or more light sources 213 may be electrically connected to electrically conductive layers and/or tracks of the printed circuit board. The one or more light sources 213 may be edge-emitting LEDs located and electrically connected at edges of the printed circuit board. In order to maintain structural flexibility of the mouthpiece, flex-foil or thin PCB technologies such as 200 or 300 um thick FR4 substrate may be preferred for the printed circuit board.

As an alternative to integrating the one or more light sources 213 with the mouthpiece 100, light may be guided to the input surfaces of the light guide 203 via light guides such as optical fibers. Accordingly, one or more external light sources may transmit light to the light guide via light guides as an alternative to using one or more light sources 213 integrated with the mouthpiece.

The one or more integrated light sources 213 or external light sources may emit light within a range of wavelengths suitable obtaining a given result of the oral care. For example, light sources which emit light in an ultra violet range may be used for plaque or bacteria hygiene. For the purpose of teeth whitening, light sources which emit visible blue light may be used.

The optically transparent teeth part 101 and the light guide 203 may be made from the same optically transparent material such as silicone. The body part 206 could also be made from the same material as the optically transparent teeth part 101, silicone filled with scattering particles like TiO2, or other material. Preferably, the optically transparent teeth part 101, the body part 206 and the light guide 203 may be made from an elastic material in so that the mouthpiece 100 can be shaped to fit individual users.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mouthpiece for teeth illumination, the mouthpiece comprising:
   an optically transparent teeth part arranged to face the buccal side of the teeth when in use,
   a light guide extending along the teeth part and arranged to transmit light to the optically transparent teeth part, wherein the light guide has an outer surface comprising a first surface facing the buccal side of the teeth and a second surface located opposite to the first surface,
   at least one light source arranged for injecting light into the light guide,
   a separation portion arranged at least between a part of the first surface of the light guide and the optically transparent teeth part to enable total internal reflection of at least a part of the injected light at least at the part of the first surface, and an out-coupling structure arranged to scatter light at a part of the second surface in the light guide to enable transmission of at least a part of the scattered light through the first surface, where the at least a part of the scattered light propagates from the second surface to the first surface via a body part of the light guide located between the first and second surfaces.

2. A mouthpiece according to claim 1, wherein the separation portion is an air-filled separation portion.

3. A mouthpiece according to claim 1, wherein the mouthpiece further comprises one or more spacers arranged at least between the optically transparent teeth part and the first surface of the light guide for establishment of the separation portion.

4. A mouthpiece according to claim 1, wherein the light guide is at least partly enclosed in a body part of the mouthpiece, wherein the body part comprises the optically transparent teeth part.

5. A mouthpiece according to claim 4, wherein the body part comprises protrusions which contact the light guide at one or more contact areas at the second surface to form the out-coupling structures at the contact areas.

6. A mouthpiece according to claim 1, wherein the mouthpiece comprises a reflector arranged behind the second surface, when seen from the first surface, to reflect light into the light guide.

7. A mouthpiece according to claim 1, wherein at least the part of the first surface is a non-scattering surface.

8. A mouthpiece according to claim 1, wherein the out-coupling structure comprises a plurality of separated out-coupling structures arranged to scatter light at a plurality of separated locations of the second surface in the light guide.

9. A mouthpiece according to claim 8, wherein at least some of the separated out-coupling structures have different surface areas facing the first surface.

10. A mouthpiece according to claim 9, wherein the surface areas are dependent on a distance between the separated out-coupling structures and the at least one light source.

11. A mouthpiece according to claim 1, comprising a sealing structure arranged for retaining an applied dental substance within a space defined by the optically transparent teeth part, a rim of the mouthpiece and the buccal side of the teeth.

12. A mouthpiece according to claim 1, wherein the optically transparent teeth part and the light guide are made from the same optically transparent material.

13. A mouthpiece according to claim 1, wherein the light guide is made from a silicone material.

14. A mouthpiece according to claim 1, wherein the optically transparent teeth part comprises a protruding bite part extending along the optically transparent teeth part, wherein the protruding bite part extends outwardly to form a bite surface.

* * * * *